United States Patent [19]

Sauer

[11] 4,300,270
[45] Nov. 17, 1981

[54] HOUSING FOR TIGHTENING ELEMENTS OF HOSE CLIPS

[75] Inventor: Heinz Sauer, Ronneburg, Fed. Rep. of Germany

[73] Assignee: Rasmussen GmbH, Maintal, Fed. Rep. of Germany

[21] Appl. No.: 100,060

[22] Filed: Dec. 4, 1979

[30] Foreign Application Priority Data

Dec. 18, 1978 [DE] Fed. Rep. of Germany ....... 2854675

[51] Int. Cl.³ .......................................... B65D 63/02
[52] U.S. Cl. .................................... 24/274 R; 24/279
[58] Field of Search ...................... 24/274 R, 279, 283, 24/284, 285, 286, 287, 289

[56] References Cited

U.S. PATENT DOCUMENTS

| | | | |
|---|---|---|---|
| 2,990,599 | 7/1961 | Gustavsson | 24/279 X |
| 3,521,334 | 7/1970 | Bergström | 24/274 R |
| 3,981,053 | 9/1976 | Kreuzer | 24/274 R |

FOREIGN PATENT DOCUMENTS

| | | | |
|---|---|---|---|
| 865085 | 1/1953 | Fed. Rep. of Germany | 24/274 R |
| 2506589 | 8/1976 | Fed. Rep. of Germany | 24/274 R |
| 2313584 | 6/1975 | France | 24/274 R |
| 682935 | 1/1952 | United Kingdom | 24/274 R |

*Primary Examiner*—Roy D. Frazier
*Assistant Examiner*—Peter A. Aschenbrenner
*Attorney, Agent, or Firm*—Peter K. Kontler

[57] ABSTRACT

The housing for the screw of a hose clip has a tubular section with a flat bottom wall a portion of which extends laterally beyond the tubular section and is overlapped by a plate-like second portion forming part of and being inclined with reference to a side wall of the tubular section. When the screw is rotated in a direction to tension the band which is placed around a hose, pipe or a like structure, the screw tends to move the extension toward such structure. The extension is or can be hollow to receive parts of the overlapping end portions of the band. Reinforcing ribs are provided at the outside of the housing between the side wall of the tubular section and the extension. The housing is made of a sheet metal blank which is deformed to form the tubular section and the two portions of the extension, and such portions of the extension are thereupon welded to each other.

13 Claims, 8 Drawing Figures

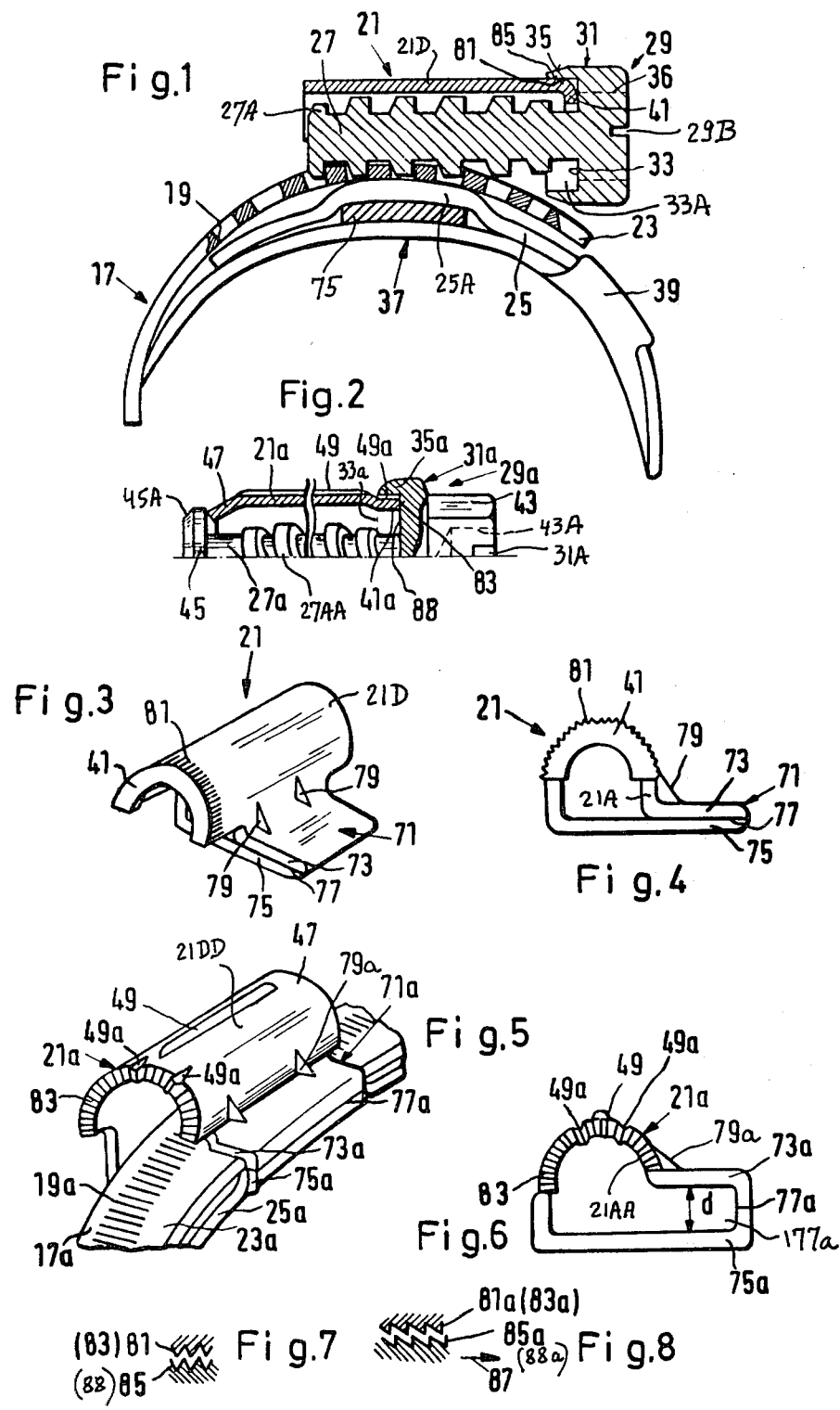

HOUSING FOR TIGHTENING ELEMENTS OF HOSE CLIPS

BACKGROUND OF THE INVENTION

The present invention relates to hose clips or clamps in general, and more particularly to improvements in housings for the tightening elements of hose clips. Still more particularly, the invention relates to improvements in housings for the tightening elements of hose clips of the type wherein the tightening elements are rotatable in the housing to thereby increase or reduce the size of the loop which is formed by the band of the clip around a pipe, hose, nipple or a like structure.

It is already known to construct the housing for the tightening element of a hose clip in such a way that the walls of the housing define a substantially tunnel-shaped passage for the stem or shank of the tightening element (hereinafter called screw for short). When the screw is rotated with reference to the housing, its shank rolls in the housing along the externally threaded end portion of the band and thereby causes such end portion to move in a direction to increase or reduce the size of the loop. When the screw is rotated in a direction to reduce the size of the loop, i.e., to tighten the bank around a hose, pipe or a like structure, its shank bears against one side wall of the housing. As soon as the tensional stress upon the band reaches a given value, the screw is likely to cause lateral tilting of the housing. Such lateral tilting entails a non-symmetrical load upon and a deformation of the housing. In many instances, the just mentioned deformation of the housing is so pronounced that it allows the head of the screw to penetrate into the housing and to expand the latter, i.e., the housing bursts open and the tensioning action of the screw upon the band is terminated.

OBJECTS AND SUMMARY OF THE INVENTION

An object of the invention is to provide a novel and improved housing for the screws of hose clips and to construct and assemble the housing in such a way that it can withstand pronounced stresses which develop when the screw is rotated in a direction to tension the band around a hose, pipe or a like structure.

Another object of the invention is to provide a housing and a screw which are designed to prevent the penetration of the head of the screw into the housing when the tensional stress upon the band increases.

A further object of the invention is to provide a housing which is constructed and assembled in such a way that it is less likely to tilt laterally in response to tensioning of the band than heretofore known housings.

An additional object of the invention is to provide a hose clip which embodies the aforedescribed housing and screw.

Another object of the invention is to provide a housing which automatically prevents uncontrolled angular displacements of the screw and which can be used in combination with a rotary screw in clips having narrow bands, bands of medium width or very wide bands.

An ancillary object of the invention is to provide a housing which can be mass-produced at a reasonable cost.

An additional object of the invention is to provide a simple and inexpensive screw for use with the above outlined housing.

The invention is embodied in a clip or clamp wherein an elonated flexible band having a threaded end portion and a second end portion is adapted to be placed around a pipe, a hose or a like structure. The clip comprises a housing having a substantially tubular section for the threaded end portion of the band and a lateral extension. The tubular section includes a flat or substantially flat bottom wall, a part of which constitutes a first component of the extension. The clip further comprises a screw or an analogous tensioning element which is rotatably mounted in the tubular section of the housing and has external threads mating with the threads of the end portion of the band. The tensioning element is rotatable in a predetermined direction to thereby tension the band by moving the threaded end portion lengthwise, and the extension is urged toward the structure which is surrounded by the band when the tensioning element is rotated in the aforementioned direction. The tubular section of the housing further includes a side wall, and the extension has a substantially plate-like second component which overlies the aforementioned part of the bottom wall. The second component is preferably integral with and makes an angle of less than 180 degrees (e.g., an angle of 90 degrees) with the side wall of the tubular section. If the extension is hollow, the distance between its components preferably equals or approximates the combined thickness of the threaded and second end portions of the band. Parts of such end portions extend into the hollow extension. The two components of the extension are preferably bonded, most preferably welded, to each other. The width of the extension, as considered in the radial direction of the shank of the tensioning element, equals or exceeds the diameter of the shank. Reinforcing means can be provided between the side wall of the tubular section and that component of the extension which is integral with the side wall.

The novel features which are considered as characteristic of the invention are set forth in particular in the appended claims. The improved clip itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a hose clip including a housing and a screw which are constructed and assembled with each other in accordance with a first embodiment of the invention;

FIG. 2 is a fragmentary sectional view of a modified housing which cooperates with a different screw;

FIG. 3 is a perspective view of the housing forming part of the hose clip shown in FIG. 1;

FIG. 4 is an end elevational view of the housing in the hose clip of FIG. 1;

FIG. 5 is a perspective view of the housing of FIG. 2, and further showing the end portions of the band;

FIG. 6 is an end elevational view of the housing which is shown in FIGS. 2 and 5;

FIG. 7 shows one form of cooperating teeth on the housing and the screw; and

FIG. 8 illustrates different teeth on the housing and screw.

DESCRIPTION OF THE PREFERRED EMBODIMENTS

Referring first to FIG. 1, there is shown a hose clip or clamp which comprises an elongated metallic band 17, a housing 21 and an externally threaded tightening element or screw 29. The median portion of the band 17 can be placed around the end portion of a hose or a similar structure which is to sealingly engage a nipple or pipe in a manner well known from the art and not specifically shown in the drawing. One end portion 23 of the band 17 is provided with holes in the form of transversely extending slots 19 so that the ribs between such slots constitute a rudimentary thread mating with the external thread 27A on the shank or stem 27 of the screw 29. The slots 19 can be provided in the major portion of the band 17 so that the latter can form relatively small, medium-sized or large loops. The other end portion 25 of the band 17 is or can be anchored in a tubular section 21D of the housing 21, e.g., in a manner as disclosed in the commonly owned copending application Ser. No. 1,263 filed Jan. 5, 1979 by Jörgen Rasmussen et al. The end portions 23, 25 of the band 17 overlap each other in the interior of the tubular section 21D of the housing 21 at a level below the shank 27 of the screw 29, as viewed in FIG. 1. In the embodiment of FIG. 1, the end portion 25 is provided with a bump 25A which overlies a bottom wall 75 of the tubular section 21D of the housing 21 and reduces the likelihood of lengthwise movement of the band 17 relative to the housing and/or vice versa.

The enlarged end portion or head 31 of the screw 29 cooperates with the adjacent end portion of the section 21D to hold the screw 29 against undesirable axial and/or radial movements with respect to the housing 21. Furthermore, the head 31 insures that the respective end portion of the section 21D cannot expand when the shank 27 is rotated in a direction to tension the band 17, i.e., to reduce the size of the loop surrounding the end portion of a hose or a like structure. As shown in FIG. 1, the head 31 has an inner end face which extends radially of the respective end of the shank 27 and has an annular groove or recess 33A with an annular bottom surface 33 which abuts against the adjacent end face of the section 21D. The recess 33A is surrounded by a tubular portion 35 of the head 31, and this tubular portion surrounds the adjacent end portion of the section 21D. In the embodiment of FIG. 1, the tubular portion 35 forms an integral part of the head 31. The outermost part 41 of the right-hand end portion of the section 21D is bent radially inwardly to form a portion of a collar which abuts against the bottom surface 33 in the deepmost portion of the annular recess 33A. The internal surface of the tubular portion 35 abuts against the external surface of the adjacent end portion of the section 21D whereby the screw 29 is held against undesirable axial and/or radial movements.

The hose clip of FIG. 1 further comprises an arcuate back support 37 which can be made of sheet metal, synthetic plastic material or rubber and has lugs 39 which overlie the end portion 25 of the band 17 at both axial ends of the tubular section 21D of the housing 21. The arcuate major part of the back support 37 is located at the inner side of the end portion 25, i.e., it contacts the external surface of the hose, pipe or a like structure which is to be surrounded by the band 17. The lugs 39 of the back support 37 can be provided with projections (not shown) which extend or can extend into the adjacent slots 19 to hold the back support 37 against movement relative to the end portion 25 and/or vice versa. The back support 37 insures or can insure that the configuration of the overlapping end portions 23, 25 of the band 17 matches or approximates the outline of the adjacent portion of the structure to be surrounded by the looped band.

Since the tubular portion 35 of the head 31 surrounds the adjacent end portion of the section 21D, the screw 29 is positively and reliably held against tilting in a clockwise direction about an axis which is normal to the plane of FIG. 1, namely, about an axis which is normal to the plane including the central symmetry plane of the clip and the axis of the shank 27. Such tendency of the screw 29 to tilt about the axis which is normal to the plane of FIG. 1 develops when the screw 29 is rotated in a direction to tension the band 17 (it being assumed that the thread 27A is a right-hand thread). When the screw 29 is rotated to subject the band 17 to a gradually increasing tensional stress, the stress is transmitted to the lower portion of the thread 27A, i.e., to that portion which meshes with the ribs between the slots 19 in the end portion 23 of the band 17.

Were the head of the screw of conventional design (as indicated in FIG. 1 by the broken lines 36), or if the head would resemble the frustum of a cone, the absence of the tubular portion 35 would enable such screw to pivot in a clockwise direction about the aforementioned axis (i.e., to pivot in the plane of FIG. 1) to an extent which would suffice to allow penetration of the head (36) into the interior of the housing with the result that the housing would expand or would burst open. Such expansion or bursting open would be even more likely because the bottom wall 75 of the housing 21 is relatively short in order to provide room for introduction of the end portions 23, 25 of the band 17, especially for the passage of the slotted end portion 23.

The provision of the collar 41 at the right-hand end of the section 21D contributes to stiffness of the corresponding part of the housing. It can be said that the collar 41 constitutes a seat along which the surface 33 in the bottom zone of the recess 33A slides when the screw 29 is rotated in and with respect to the section 21D. Since the end portion of the tubular section 21D of the housing 21 is stiffened by the collar 41, and since this stiffened end portion is surrounded by the tubular portion 35 of the head 31, the screw 29 is prevented from pivoting clockwise about an axis which is normal to the plane of FIG. 1 so that the head 31 cannot penetrate into the section 21D and the latter remains intact even if the band 17 is subjected to a very pronounced tensional stress.

As shown in FIG. 1, the outer diameter of the tubular portion 35 decreases in a direction toward the free end of this tubular portion. It can be said that at least a part of the tubular portion 35 tapers inwardly in a direction toward the free end thereof, i.e., toward that end of the section 21D which is remote from the collar 41. Therefore, at least a part of the portion 35 is bounded by a conical surface which is desirable because it facilitates the threading of the end portion 23 through the section 21D between the bottom wall 75 and the shank 27. FIG. 1 shows that the end portion 23 extends between the shank 27 and the end portion 25 of the band 17. In the absence of the taper at the free end of the tubular portion 35, the end face at the leader of the end portion 23 would be likely to be caught and intercepted by the tubular portion 35.

Additional details of the housing 21 are shown in FIGS. 3 and 4. This housing can be made of a flat sheet metal blank which is suitably deformed so as to have a substantially cylindrical or tubular section 21D for the shank 27 and a lateral extension 71 which includes a part of the aforementioned flat or substantially flat bottom wall 75. The extension 71 further includes a second plate-like component 73 which overlies the aforementioned part or component of the bottom wall 75 and makes an angle of approximately 90 degrees (i.e., less than 180 degrees) with the adjacent side wall 21A of the section 21D. The two plate-like components of the extension 71 are immediately adjacent to each other and are preferably welded or otherwise secured (e.g., riveted) to each other. The line 77 is intended to denote a welded connection between the two components of the extension 71. The housing 21 is reinforced or stiffened by ribs 79 which are provided between the outer sides of the upper component 73 of the extension 71 and the side wall 21A. The purpose of the extension 71 is to prevent the housing 21 from turning about the axis of the shank 27 when the screw 29 is rotated in a direction to tension the band 17. The shank 27 tends to roll along the end portion 23 of the band 17 and to entrain the housing 21 in the direction of its rotation, namely, to move the extension 71 toward the structure which is surrounded by the looped band 17. In FIG. 1, this structure includes the back support 37. Such tendency is even more pronounced because the tubular portion 35 of the head 31 surrounds the respective end portion of the section 21D so that the screw 27 can subject the band 17 to very pronounced tensional stresses for reasons which were explained above, i.e., such stresses are or can be more pronounced than if the head 31 were merely held against axial movement relative to the section 21D of the housing 21.

The width of the extension 71 (as considered radially of the section 21D and shank 27) at least equals the diameter of the shank 27. This can be readily seen in FIG. 4. The just mentioned selection of the width of the extension 71 insures that the housing 21 bears against the band 17 and/or against the back support 37 with a considerable force because it is in large surface-to-surface contact with such parts. Indirectly, the extension 71 bears against the hose, pipe or a like structure which is clamped by the improved clip.

That end portion of the section 21D which is surrounded by the tubular portion 35 of the head 31 is provided with a set of external teeth 81 which are shown in FIGS. 1, 3, 4 and 7. The teeth 81 extend in parallelism with the axis of the shank 27. The internal surface of the tubular portion 35 is formed with a second set of teeth 85 which are parallel to the teeth 81 and can engage the teeth 81. The purpose of the mating teeth 81, 85 is to prevent excessive rotation of the screw 29 in a direction to tension the band 17. Thus, these teeth allow for stepwise rotation or ratcheting of the screw 29 so that the person in charge is less likely to subject the band 17 to excessive tensional stresses. For example, assume that the head 31 has a rounded outline and has a diametral slot 29B for the working end of a screwdriver or an analogous tool. When the band 17 is already taut about a hose or a like structure and the operator attempts to subject the band to additional tensional stresses, the tool which is used to rotate the screw 29 must expel the teeth 81 from the tooth spaces between the adjacent teeth 85 and vice versa before the screw 29 can be rotated by an increment so as to move the teeth 81 into the next-following tooth spaces, and so forth. Each expulsion of teeth 81 from the tooth spaces between the teeth 85 requires a greater effort than the preceding expulsion so that the operator is much less likely to destroy the clip by subjecting the band 17 to excessive tensional stresses.

The teeth 81 or 85 can be omitted, i.e., it suffices to provide teeth solely at the exterior of the section 21D or in or on the internal surface of the tubular portion 35. The teeth of the single set then bite into the material of the adjacent part with the same result or with a result similar to that which is achievable by providing two sets of normally mating teeth. After a series of rotations of the screw 29, the single set of teeth (81 or 85) creates a set of mating teeth on the originally smooth surface of the housing 21 or tubular portion 35.

The teeth 81 and 85 can be symmetrical as shown in FIG. 7. This renders it possible to readily rotate the screw 29 in a direction to reduce the tensional stress upon the band 17. However, if the teeth (indicated at 81a and 85a in FIG. 8) are non-symmetrical, e.g., if such teeth have a sawtooth profile, the screw 29 can be rotated in a single direction (namely in a direction, shown by arrow 87, to tension the band 17) but is held against rotation in the opposite direction (except, of course, by destroying the top lands or the major portions of the teeth 81a and/or 85a).

FIGS. 2, 5 and 6 illustrate a second hose clip having a modified housing 21a and a modified screw 29a. The head 31a of the screw 29a has a hexagonal external surface 43 and an axial socket 43A which is also of polygonal (preferably hexagonal) cross-sectional outline so that the screw 29a can be rotated by several types of tools. Also, the head 31a has a diametrically extending slot 31A for the working end of a screwdriver, a portion of a coin or another rudimentary tool which can be resorted to in order to turn the screw 29a in a direction to tension or to reduce the tension upon the band 17a. As a rule, the use of tools which engage the hexagonal surface 43 or enter the socket 43A in the head 31a allows for the application of more pronounced tensional stresses than the use of a screwdriver or the like.

The free end portion of the tubular portion 35 of the head 31a shown in FIG. 2 is rounded so as to allow for rapid threading of the end portion 23a of the band 17a through the tubular section 21DD of the housing 21a. The tubular portion 35a of FIG. 2 can be shaped by resorting to a cold forming technique or in a material removing machine (e.g., in a turning machine or the like).

The free end portion or tip of the shank 27a of the screw 29a has a ring-shaped flange 45 which is bounded by one or more frustoconical facets 45A and serves as an abutment for the respective end portion 47 of the section 21DD. The end portion 47 can be bent inwardly so as to engage a facet 45A after insertion of the screw 29a, i.e., after introduction of the shank or stem 27a into the section 21DD so that the flange 45 is exposed. The parts 45 and 47 cooperate to prevent uncontrolled angular movements of the screw 29a while the latter is rotated in a direction to reduce the tensional stress upon the band 17a. In addition, the parts 45, 47 cooperate to relieve the pressure between the bottom surface of the recess in the head 31a and the adjacent end portion of the section 21DD. The tubular section 21DD of the housing 21a is reinforced by a longitudinally extending stiffening rib 49. If desired, the section 21DD can be provided with two or more stiffening elements which may but need not extend in parallelism with the axis of the screw 29a.

That end portion (41a) of the section 21DD which is adjacent to the head 31a of the screw 29a does not form an inwardly extending collar (such as the collar 41 of FIG. 1) but forms a portion of a tube or cylinder which is coaxial with the shank 27a of the screw 29a. The external surface of the cylinder 41a is reinforced by several stiffening ribs 49a which are parallel to the axis of the screw 29a.

FIGS. 5 and 6 show that the housing 21a has a modified (hollow) extension 71a of substantially U-shaped cross-sectional outline. Thus, the right-hand portion of the bottom wall 75a of the tubular section 21DD of the housing 21a is not immediately adjacent to that component 73a which is integral with and extends at right angles to the respective side wall 21AA of the section 21DD. The positions of the stiffening ribs 79a are analogous to those of the ribs 79 shown in FIG. 3. As shown in FIG. 5, the end portion 47 is still coplanar with the adjacent part of the section 21DD because the housing 21a is shown prior to insertion of the screw 29a. As explained above, the portion 47 is bent inwardly to constitute a portion of a hollow conical frustum subsequent to introduction of the shank 27a into the tubular section 21DD of the housing.

The welded connection 77a between the components 73a, 75a of the extension 71a is located in a plane which is disposed substantially midway between such components. The width d of the compartment 177a between the components 73a and 75a at least equals the combined thickness of the end portions 23a, 25a of the band 17a so that the respective marginal zones of such end portions can be received in the compartment 177a when the clip including the housing 21a is fully assembled. Those portions of the components 73a, 75a which are immediately adjacent to the welded connection 77a are preferably normal to the plane of the major portion of the bottom wall of the housing 21a. The connection 77a may constitute a simple butt welded seam.

The slots 19a in the end portion 23a of the band 17a are provided off center, i.e., they are adjacent to that marginal zone which is remote from the compartment 177a. This is due to the provision of the extension 71a. The lines 19a in FIG. 5 need not denote slots which extend all the way through the end portion 23a. Instead, the thread 27AA of the shank 27a can mesh with ribs which are disposed between relatively shallow grooves (19a) in the exposed side of the end portion 23a. The same holds true for the end portion 23 of the band 17 shown in FIG. 1.

It has been found that the extension 71a exhibits several important advantages. Thus, the housing 21a can receive portions of a relatively wide band 17a, and the U-shaped extension 71a enhances the rigidity of the housing 21a so that the band 17a can be subjected to very pronounced tensional stresses without any danger of deforming or destroying the housing.

FIGS. 2, 5 and 6 show that one end face of the section 21DD (namely, the end face which is adjacent to the head 31a of the screw 29a) has a set of radially extending teeth 83 mating with complementary teeth 88 in the bottom surface of the annular recess 33a in the head 31a. The manner in which the teeth 83 and 88 cooperate to reduce the likelihood of excessive tensioning of the band 17a is practically identical and evidently analogous to the manner of cooperation between the teeth 81 and 85 on the section 21D and screw 29. The teeth 83 can be provided on the flange 45 and the teeth 88 are then provided on the end face of the end portion 47. It is also possible to employ two sets of teeth 83 and two sets of teeth 88. If the teeth 83, 88 are configurated in a manner as shown in FIG. 7, they allow for a reduction of the tensional stress upon the band 17a. If the teeth (83a and 88a) are non-symmetrical (see FIG. 8), the teeth 88a can be moved in the direction of arrow 87 to tension the band 17a but cannot be moved in the opposite direction.

It is also possible to provide the housing (21 or 21a) with at least one set of teeth 81 or 81a as well as with at least one set of teeth 83 or 83a, and to provide the screw (29 or 29a) with at least one set of teeth 85 or 85a as well as with at least one set of teeth 88 or 88a.

An important advantage of the improved clip is that its housing 21 or 21a is provided with the extension 71 or 71a. Such extension invariably prevents tilting of the respective housing when the screw is rotated in a direction to tension the band, i.e., while the shank of the screw tends to roll along the externally threaded end portion 23 or 23a of the band. The extension 71 or 71a reduces the likelihood of several types of deformation of the housing (including lateral deformation) and further insures that the housing is not destroyed or otherwise seriously damaged during tensioning of the band.

An advantage of the extension 71 is that it can be manufactured at a relatively low cost. This will be readily appreciated because the entire bottom wall of the housing 21 remains flat and the upper component of the extension 71 is simply a flat outwardly bent portion of the respective side wall 21A of the tubular section 21D of the housing 21. As mentioned above, the starting material for the making of the housing 21 may constitute a flat sheet metal blank.

The advantages of the extension 71a were pointed out above, i.e., the housing 21a can receive a relatively wide band 17a and is even less likely to undergo premature deformation because the U-shaped extension 71a furnishes a highly satisfactory stiffening action.

Welding constitutes the presently preferred mode of converting a blank into the housing 21 or 21a. The reason is that the extension 71 or 71a is readily accessible so that it can be inserted into a conventional welding machine or reached by a simple welding tool. Butt welding is the presently preferred bonding technique. A simple welding technique is satisfactory because the connection between the components of the extension 71 or 71a is subjected primarily to compressive stresses, i.e., the stresses which tend to move the components of the extension 71 or 71a apart are negligible or nil.

The ribs or like reinforcing or stiffening elements on or in the region of the tubular section 21D or 21DD of the housing 21 or 21a prevent the latter from collapsing in the region where the extension 71 or 71a merges into the respective tubular section of the housing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In a clip wherein an elongated band having a threaded end portion and two marginal zones which flank said threaded end portion is adapted to be placed around a hose or a like structure, the combination of a housing having a substantially tubular section for said end portion of the band and a single lateral extension, said tubular section being nearer to one than to the other marginal zone and said extension being nearer to said other marginal zone of the band, said tubular section including a bottom wall forming part of said extension, and a tensioning element rotatably mounted in said tubular section and having external threads meshing with the threads of said end portion, said element being rotatable in a predetermined direction to thereby tension the band and said extension being urged toward the structure which is surrounded by the band when said element is rotated in said direction.

2. The combination of claim 1, wherein at least the major part of said bottom wall is substantially flat.

3. The combination of claim 1, wherein said tubular section further includes a side wall and said extension includes two substantially parallel plate-like components one of which forms part of said bottom wall and the other of which is integral with said side wall.

4. The combination of claim 3, wherein said other component and said side wall make an angle of less than 180 degrees.

5. The combination of claim 1, wherein said extension is hollow and the band includes two overlapping end portions extending in part into the interior of said extension.

6. The combination of claim 5, wherein said extension comprises two spaced-apart substantially parallel components and the distance between said components approximates the combined thickness of the end portions of the band.

7. The combination of claim 1, wherein said extension includes several components which are bonded to each other, one of said components constituting said part of said bottom wall and another of said components overlying said part of said bottom wall.

8. The combination of claim 7, wherein said components are welded to each other.

9. The combination of claim 1, wherein said housing further comprises reinforcing means interposed between said section and said extension.

10. The combination of claim 9, wherein said reinforcing means includes at least one rib which is integral with said section and said extension.

11. The combination of claim 1, wherein said tensioning element includes a shank having a predetermined diameter and the width of said extension, as considered at right angles to the axis of said shank, at least equals said diameter.

12. The combination of claim 11, wherein said housing consists of sheet metal.

13. The combination of claim 1, wherein said section of said housing has an end portion and said element includes an enlarged end portion abutting against the end portion of said section.

* * * * *